March 20, 1928.　　　　　　　　　　　　　　1,662,867
R. SCHARPHUIS
ICE CREAM CONE TONGS OR LIFTER
Filed Jan. 21, 1927
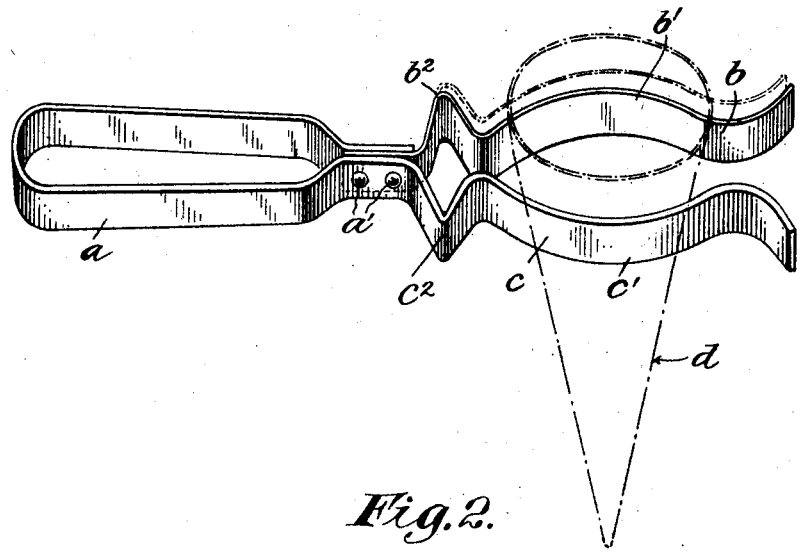
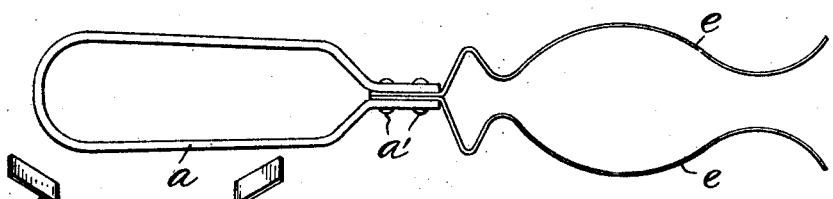
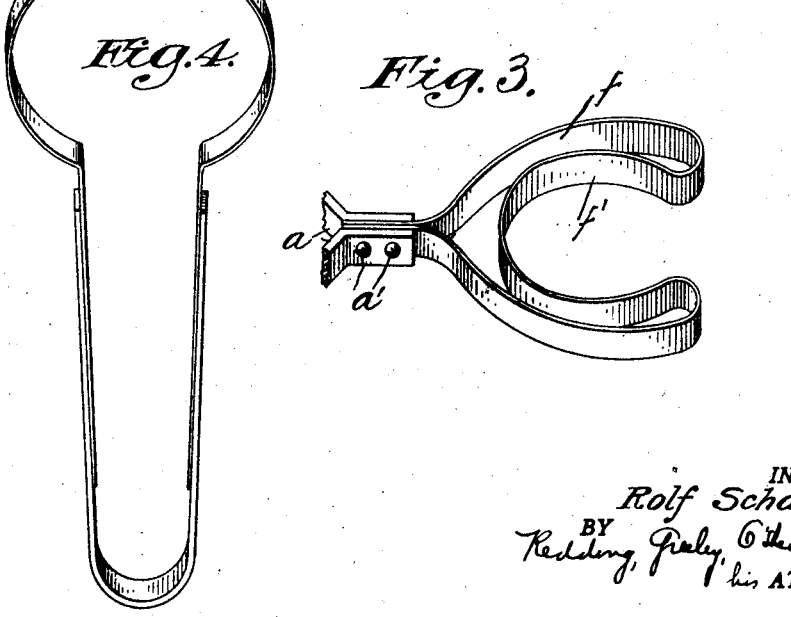
INVENTOR
Rolf Scharphuis
BY Redding, Greeley, O'Shea & Campbell
his ATTORNEYS Patented Mar. 20, 1928.

1,662,867

UNITED STATES PATENT OFFICE.

ROLF SCHARPHUIS, OF PORT TOWNSEND, WASHINGTON.

ICE-CREAM-CONE TONGS OR LIFTER.

Application filed January 21, 1927. Serial No. 162,447.

In the sale of ice cream cones it is necessary to remove a single cone from a series of nested ones, and fill it with cream to prepare the cone for sale. In this operation the fingers usually are used, although waxed paper is sometimes used in holding the cone in the interest of sanitation. Obviously the necessity of grasping the cone with the waxed paper, glove or other protective means requires added labor and, where a great quantity of cones is sold, it is highly impractical.

The present invention provides a simple and sanitary means for removing a single cone from a group of nested ones and placing it in a suitable receptacle which adapts it to be easily filled in the usual manner.

In the operation the cone is grasped and removed without exerting too much pressure upon its sides so that the cone is preserved in spite of its fragile nature.

Reference will now be had to the accompanying drawings forming a part hereof for a more detailed description of the invention, wherein:

Figure 1 is a perspective view of the tongs, an ice cream cone grasped thereby being shown in dot and dash lines.

Figure 2 is a plan view of a form of the invention slightly modified.

Figure 3 is a perspective view of a further modification wherein the fingers consist of a continuous spring member.

Figure 4 is a perspective view of a further modification wherein the mid section between the handle and gripping portions is not riveted.

With reference to Figure 1, $a$ designates the handle of the tongs, in this instance being formed of a metal strip, of suitable configuration and secured in position by rivets $a'$. One of the ends of the handle extends beyond the neck portion and forms a relatively rigid finger $c$. Co-operating with the rigid finger and secured between the handle portions by the rivets $a'$ is a relatively flexible spring finger $b$ which is formed similar to finger $c$ and serves to flex when receiving a cone in order that the latter may be held thereby. The outer ends of the fingers diverge so that they may be pushed over a cone and, in grasping it, the diverging portions ride up over the cone until it is received in the concave portions $b'$ and $c'$ of each finger. Crimped portions $b^2$ and $c^2$ impart flexibility to the spring members, and enable them to grasp the cone $d$ yieldingly.

In the modification shown in Figure 2 the spring fingers $e$ are each formed from the same material and in the same manner, being secured between the ends of the handle portion by the rivets $a'$. In this modification the two arms $e$ flex equally when the tongs are pushed over a cone to grasp the sides thereof and the resulting tension in the arms holds the cone.

In Figure 3 the fingers of the tongs are made from a continuous strip of flexible material $f$, the two ends thereof being secured to the handle portion by rivets $a'$. In this form the inner, or engaging portion $f'$ of the fingers fits around the sides of the cone and engages a greater surface thereof. The desirability of distributing the gripping force of the fingers in this manner is quite obvious since the likelihood of crushing the cone is greatly reduced.

The modification shown in Figure 4 embodies a U-shaped handle portion, to the ends of which are secured the co-operating spring clip members, and the manner in which this is used is obvious.

The tongs described herein are highly effective in removing a cone from a series of nested ones. If it should stick in the lower cone, twisting movement of the tongs back and forth about the longitudinal axis thereof will cause the fingers to creep down the conical sides of the cones and pry it away from the lower one, the fingers engaging the top of the latter to assist in removing the cone from its nest. After the cone has been removed, it may be inserted in a conical receiver which conforms to the surface of the cone, and in this manner, during the entire operation of filling with ice cream and serving, it is unnecessary to touch the cone with the fingers.

It is obvious that the invention may be carried out in many different ways. The handle may be constructed of any desired material and the spring clips may be secured thereto in any well known fashion. The fingers or grasping elements may be of any resilient and yielding material and the invention is not to be limited save as defined in the appended claim.

What I claim is:

In a device for grasping an ice cream cone, a handle portion, a pair of spring fingers, outwardly diverging ends on the fingers, opposed concave portions on the fingers to receive the cone and crimped portions between the handle and the fingers to increase the flexibility thereof, whereby the pressure of the fingers will be distributed uniformly over the contacting portions of the cone and fingers.

This specification signed this 11 day of January A. D. 1927.

ROLF SCHARPHUIS.